United States Patent [19]

Akabane et al.

[11] Patent Number: 4,857,948
[45] Date of Patent: Aug. 15, 1989

[54] CAMERA

[75] Inventors: Jun Akabane; Ken Moro, both of Tokyo; Masayasu Yamamoto, Kawasaki, all of Japan

[73] Assignee: Nikon Corporation, Tokyo, Japan

[21] Appl. No.: 167,149

[22] Filed: Mar. 11, 1988

[30] Foreign Application Priority Data

Mar. 19, 1987 [JP] Japan ................................. 40397[U]

[51] Int. Cl.$^4$ ............................................. G03B 17/02
[52] U.S. Cl. ..................... 354/288; 354/82; D16/217
[58] Field of Search .............. 354/288, 82, 293; 352/242, 243; D16/1, 4, 200, 206, 208, 209, 216, 217, 218

[56] References Cited

U.S. PATENT DOCUMENTS

| D. 254,259 | 2/1980 | Miller et al. | D16/4 |
| D. 293,685 | 1/1988 | Tanaka et al. | D16/1 |
| 3,537,785 | 11/1970 | Jablonski | 352/243 |
| 4,699,486 | 10/1987 | Konno et al. | 354/82 |

FOREIGN PATENT DOCUMENTS 60-11322 1/1985 Japan .

Primary Examiner—A. A. Mathews
Attorney, Agent, or Firm—Shapiro and Shapiro

[57] ABSTRACT

A rearwardly bent camera has a holding portion adapted to be grasped by the right hand of a photographer. Preferably, the bending angle of the holding portion relative to the front surface of the camera body is in the range of 5 to 35 degrees.

10 Claims, 2 Drawing Sheets

CAMERA

BACKGROUND OF THE INVENTION

1. Field of the Invention

The present invention relates to a camera and more particularly to an improvement relating to a holding portion for the camera.

2. Related Background Art

A conventional camera of the type including a holding portion is disclosed, for instance, in an official gazette of Japanese Utility Model Laid-Open No. 11322/1975. As shown in FIG. 3, the conventional camera is so constructed that both a fore surface 16a and a rear surface 16b of a holding portion 16 adapted to be grasped by the right hand of a photographer 17 are bent forwardly by substantially the same angle $\beta$ relative to both a fore surface 11b and a rear surface 11c of a camera body 11 the surfaces 11b and 11c extending at a right angle relative to an optical axis of a photographing lens. When a photographer 17 effects photographing with the use of the camera, he supports the rear surface 11c of the camera body 11 or the rear surface 16b of the holding portion 16 by the thumb 17c of his right hand, grasps the holding portion 16 with his fingers while taking a very steady posture, searches for an object to be photographed (not shown) by observing it through a finder 18, and then depresses a release button 15. Because the holding portion 16 of the conventional camera is bent forwardly relative to both the fore surface 11b and the rear surface 11c of the camera body 11, the photographer's middle finger 17a must assume an unnatural inclination relative to the direction of the forefinger 17b. Moreover, he may experience discomfort in his middle finger 17a and forefinger 17b caused by front and side corner parts 11d and 11e of the holding portion 16. The discomfort is worse when the corner parts 11d and 11e of the camera body 11 are substantially square; but when the corner parts 11d and 11e are rounded so as to obviate this problem, the volume of the interior of the camera body 11 is reduced, thus compromising design efficiency.

SUMMARY OF THE INVENTION

The present invention has been made with the foregoing problems in mind and its object resides in providing a camera including a camera body which is entirely free from the foregoing problems and which assures that the camera body comfortably fits the right hand of a photographer and is stably supported when held in a natural manner, whereby photographing can be achieved stably and reliably.

To accomplish the above object, the present invention provides a camera including a camera body wherein both a fore surface and a rear surface of a holding portion adapted to be grasped by the right hand of a photographer are bent rearwardly by substantially the same angle relative to both a fore surface and a rear surface of a box shaped the camera body extending in a direction at a right angle relative to the optical axis of a photographing lens.

According to the present invention, the holding portion of the camera body is constructed in the abovedescribed manner. Consequently, the photographer does not feel any discomfort in his hand irrespective of the shape of the corner parts of the holding portion, and there is no need to compromise volumetric efficiency of the interior of the camera body. Further, since the camera body is held with the right hand extending along the outer surface of the camera body the photographer naturally keeps his right side in tight, whereby photographing can be achieved stably and reliably.

DESCRIPTION OF THE PREFERRED EMBODIMENT

Figure 1:
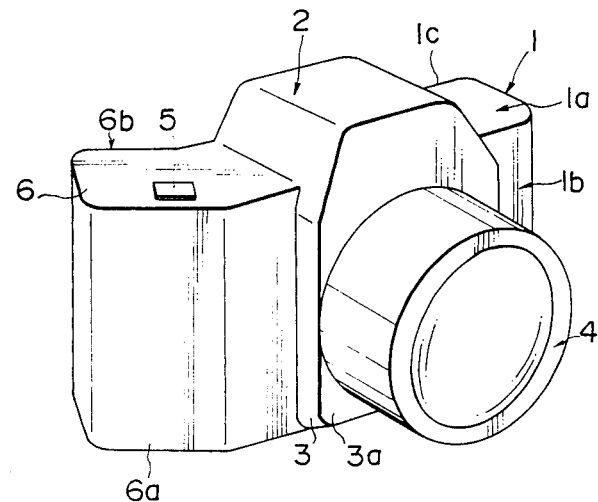
FIG. 1 is a perspective view of a camera in accordance with an embodiment of the present invention.
Figure 2:
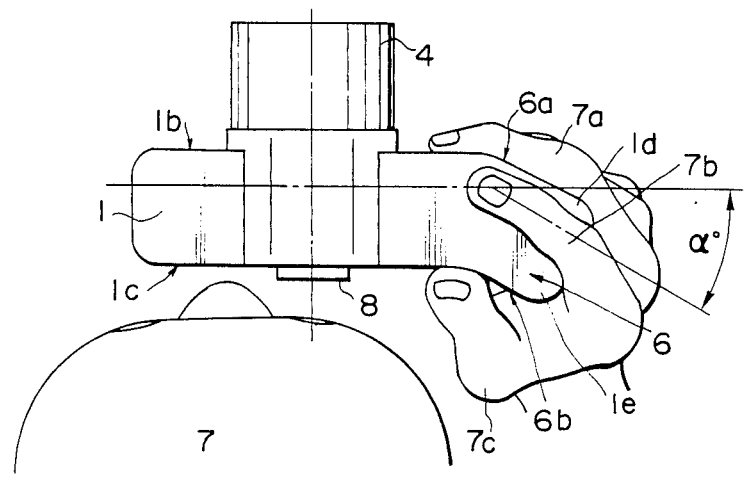
FIG. 2 shows the camera in FIG. 1 as viewed from above.

The present invention will now be described in greater detail with reference to the accompanying drawings which illustrate a preferred embodiment thereof. FIG. 1 is a perspective view of a camera in accordance with an embodiment of the invention, and FIG. 2 shows the camera in FIG. 1 as viewed from above.

As is apparent from FIG. 1, the camera body 1 is equipped with a pentagonal prism 2 at the upper part thereof, and an apron 3 is formed on the fore surface 1b of the camera body 1. A photographing lens 4 is arranged on the fore surface 3a of the apron 3. Further, the camera body 1 is provided with a release button 5 on the right-hand side of an upper surface 1a thereof (on the left-hand side as viewed in FIG. 1). As shown in FIG. 2, a holding portion 6 of the camera body 1 adapted to be grasped by the right hand of a photographer 7 is bent rearwardly in such a manner that an angle as identified by $\alpha$ is defined between both the fore surface 6a and the rear surface 6b of the holding portion 6 and both the fore surface 1b and the rear surface 1c of the camera body 1.

Next, description will be made below as to handling of the camera in use.

Figure 3:
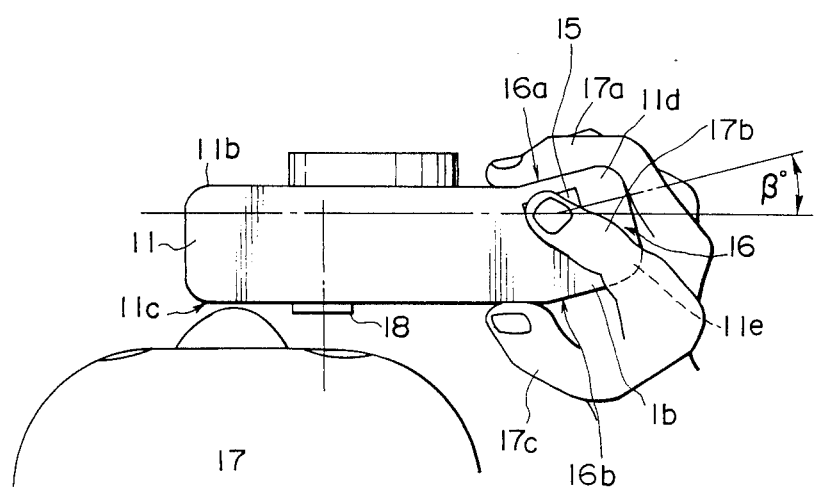
FIG. 3 shows a conventional camera as viewed from above.

While the photographer 7 is photographing an object, the fore surface 6a of the holding portion 6 is supported by substantially the whole length of the middle finger 7a of the right hand, and the rear surface 1c of the camera body 1 or the rear surface 6b of the holding portion 6 is supported by the thumb 7c of the right hand. At the same time, the fore surface 6a of the holding portion 6 is additionally supported by the third finger and the little finger of the right hand. By the photographer's holding the rearwardly bent holding portion 6 in this manner, it follows that he naturally assumes such a posture that his right-hand side stays in tight. With the holding portion 6 is grasped in this way, an object to be photographed (not shown) is viewed through a viewfinder exit 8 and the photographing lens 4 is properly adjusted in respect of iris diaphragm and focus (not shown), photographing is then achieved by depressing the release button 5 with the forefinger 7b of the right hand. As will be appreciated from FIG. 2, because the fore surface 6a and the rear surface 6b of the holding portion 6 are rearwardly bent at substantially same angle relative to both the fore surface 1a and the rear surface 1b of the camera body 1, the photographer's middle finger 7a comes in contact with the fore surface 6a of the holding portion 6 in such a manner as to extend along the outer surface of the holding portion 6 and, since the forefinger 7b does not come in contact with a side corner part 1e of the rear surface 6b of the holding portion Therefore, the photographer will not experience any discomfort in his middle finger or his forefinger even if the corners 1d and 1e are substantially square. Accordingly, there is no need for rounding the corners as with the conventional camera of FIG. 3, and thus no need to compromise volumetric efficiency with respect to the interior of the camera body. Further, since photographing is effected by holding the camera body 1 with the holding portion 6 grasped by the middle finger 7a of the right hand which extends along the outer surface of the camera body 1, the photographer naturally keeps his right side in tight, whereby photographing can be achieved stably and reliably.

Incidentally, it is preferably that an angle $\alpha$ defined by the fore surface 6a and the rear surface 6b of the holding portion 6 relative to the fore surface 1b and the rear surface 1c of the camera body 1 be in the range of 5 to 35 degrees. In the illustrated embodiment, the camera body is so designed that angle $\alpha$ is about 15 degrees.

We claim:

1. A still camera, comprising a camera body, a photographic lens at the front of the camera body, a viewfinder exit at the rear of the camera body, and a shutter release at the top of the camera body, wherein the right-hand end of the camera body as viewed from the rear is provided with a rearwardly bent holding portion dimensioned to be grasped by and to fit into the right hand of a photographer during picture taking, with the thumb of the right hand supporting the rear of the camera body, the middle finger of the right hand extending along a front surface of the holding portion and supporting the front of the camera body along substantially the entire finger length, and the forefinger of the right hand disposed on top of the holding portion, and wherein the shutter release is positioned to be operated by the forefinger of the right hand with the holding portion fitted into and grasped by the right hand as aforesaid.

2. A still camera according to claim 1, wherein the shutter release is disposed at a top surface of said holding portion.

3. A still camera according to claim 1, wherein said holding portion is bent rearwardly at an angle in the range of 5°–35° relative to a plane perpendicular to an optical axis of said photographic lens.

4. A generally box-shaped still camera body having a front surface with means for mounting a photographic lens thereon on an optical axis generally perpendicular to said front surface, and a rear surface substantially parallel to said front surface, and wherein right-hand lengthwise ends of said front and rear surfaces, as viewed from the rear of said camera body, are rearwardly bent at substantially the same angle to define a rearwardly bent holding portion of the camera body for fitting into and being grasped by the right hand of a photographer during picture taking.

5. A still camera body according to claim 4, wherein said angle of bending is in the range of 5°–35°.

6. A still camera body according to claim 4, wherein the shutter release is at a top surface of said holding portion and disposed for operation by the forefinger of the photographer's right hand when said holding portion is fitted into and grasped by the photographer's right hand during picture taking.

7. A generally box-shaped still camera body having a front surface with means for mounting a photographic lens thereon, a rear surface with a viewfinder exit, and a shutter release, wherein, as viewed from the rear, the right-hand lengthwise end of the camera body is rearwardly bent so as to define a holding portion dimensioned to be grasped by and to fit into the right hand of a photographer during picture taking, with the right thumb supporting the rear surface of the camera body, the middle finger of the right hand supporting along substantially its entire length the front surface of the camera body, and the forefinger of the right hand disposed on top of the holding portion, and wherein the shutter release is disposed for operation by one of the fingers of the right hand with the holding portion fitted into and grasped by the right hand as aforesaid.

8. A still camera body according to claim 7, wherein the shutter release is disposed at a top surface of said holding portion and disposed for operation by the forefinger of the photographer's right hand when said holding portion is fitted into and grasped by the photographer's right hand as aforesaid.

9. A still camera body according to claim 7, wherein said holding portion has parallel front and rear surfaces.

10. A still camera body according to claim 9, wherein said front and rear surfaces are bent rearwardly at an angle in the range of 5°–35° relative to a plane perpendicular to the optical axis of the photographic lens when mounted to said mounting means.

* * * * *